United States Patent Office 3,390,140
Patented June 25, 1968

3,390,140
PROCESS FOR THE COPOLYMERIZATION OF CARBON BISULFIDE WITH AN OLEFINIC ORGANIC COMPOUND
Harold M. Pitt, Lafayette, and Ferenc M. Pallos, Concord, Calif., assignors to Stauffer Chemical Company, New York, N.Y., a corporation of Delaware
No Drawing. Filed Mar. 16, 1966, Ser. No. 534,657
19 Claims. (Cl. 260—79)

ABSTRACT OF THE DISCLOSURE

Process for preparing copolymers and terpolymers by contacting carbon bisulfide with an α-olefin or a conjugated diene in an inert atmosphere using a Ziegler-type catalyst of (A) alkyl aluminum dihalide, alkyl aluminum sesquihalide, dialkyl aluminum bromide, dialkyl aluminum chloride·solvent-complex, or trialkyl aluminum·solvent-complex and a compound of a transition metal of Group IV–VIII; (B) dialkyl aluminum chloride stoichiometric complexes with a compound of a transition metal of Group IV–VIII, or (C) trialkyl aluminum stoichiometric-complexes with a compound of a transition metal of Group IV–VIII, at pressures between atmospheric and superatmospheric up to about 100 atmospheres and at temperatures ranging from about −20° C. to about 100° C.

It has been found that while carbon bisulfide can be homopolymerized only at exceedingly high pressures it may be copolymerized with olefinic organic material capable of polymerizing or copolymerizing in the presence of a Ziegler-type catalyst. Typical olefinic monomers which are approximately equally capable of polymerizing in the presence of various Ziegler-type catalysts are ethylene, higher α-olefins such as propylene, 1-butene, isobutylene, 1-pentene, 1-hexene, styrene, 3-methyl-1-butene and 4-methyl-1-hexene, and conjugated diolefins such as butadiene and isoprene. Similarly, the aforementioned monomers in the presence of a Ziegler-type catalyst are capable of copolymerizing with ethylene or any other of the α-olefins.

By a Ziegler-type catalyst we mean mixtures of organometallic derivatives of Periodic Group I–III metals and compounds of transition metals of Periodic Groups IV–VIII. The Ziegler-type catalysts are the result of the reaction of two different species of metal compounds: (1) compounds of Groups IV–VIII transition elements, commonly called the catalyst, and (2) compounds such as metal hydrides and alkyls of Group I–III metals capable of giving rise to hydride ions or carbanions, commonly called the cocatalyst. Catalysts which are effective, in conjunction with cocatalysts, for the copolymerization of ethylene, other α-olefins and conjugated dienes with carbon bisulfide as in the instant invention, include compounds of titanium, zirconium, vanadium, niobium, cobalt and the like. The transition metal compounds which are generally used include the halides, oxychlorides, acetylacetonates, alcoholates, oxides and the like. Cocatalysts usable with Group IV–VIII metal compounds in polymerization reactions of ethylene, higher α-olefins and conjugated dienes, include aluminum alkyl, such as aluminum triisobutyl; aluminum aryls such as aluminum triphenyl; aluminum arylalkyls such as aluminum tribenzyl; aluminum aryl alkyls such as aluminum diethyl phenyl; aluminum compounds of the general formula $R_2AlX$ where R is hydrogen or an alkyl or aryl group and X is hydrogen, such as aluminum hydride and diethyl aluminum hydride; alkyl aluminum halide such as diethyl aluminum bromide; and alkyl aluminum sesquihalides, which are a mixture of a dialkyl aluminum halide and an alkyl aluminum dihalide, such as ethyl aluminum sesquichloride. In the case of the titanium and vanadium compounds, aluminum compounds are preferred as cocatalysts in the process herein described, although the catalysts may be used in conjunction with any cocatalyst selected from the organo-compounds of the Group I–III metals. Preferably the aluminum compounds are selected from the group consisting of alkyl aluminum diahalide, alkyl aluminum sesquihalide, dialkyl aluminum bromide, dialkyl aluminum chloride in solvent-complex, trialkyl aluminum in solvent complex, dialkyl aluminum chloride in stoichiometric-complexes with a compound of a transition metal of Group VI–VIII and trialkyl aluminum in stoichiometric-complexes with a compound of a transition metal of Group IV–VIII.

It is known that certain catalyst systems herein contemplated react adversely with carbon bisulfide; this is obviously not desirable. In order to overcome this, a reactive Ziegler catalyst complex system is prepared in an inert solvent, such as hexane, prior to adding the catalyst to carbon bisulfide. An alternative procedure may be used in the case of carbon bisulfide reactive non-hydrogen containing aluminum compounds to be used in the Ziegler catalyst system. The reactive aluminum compound and a solvent such as anisol or diphenyl oxide are first combined, this mixture is added to the carbon bisulfide and the transition metal compound is then added to the carbon bisulfide to form the Ziegler catalyst in situ. Further, in the case of dialkyl aluminum chloride and trialkyl aluminum compounds a complex must be formed in stoichiometric proportions with a compound of a transition metal of Groups IV–VIII. This is necessary in order to prevent dialkyl aluminum chloride or trialkyl aluminum compounds from reacting with carbon bisulfide, thereby prohibiting the copolymerization as herein contemplated.

When using Ziegler-type catalysts it is sometimes desirable to include a so-called complexing agent in the reaction mixture. Suitable complexing agents include ethers, tertiary amines, esters, ketones, and the like. Particularly effective complexing agents include diethyl ether, triethylamine, ethyl acetate, tetrahydrofuran and the like.

The copolymerization process of the present invention between carbon bisulfide and ethylene, higher α-olefins and conjugated dienes may be carried out under a variety of conditions, the modifications of which are dictated by the desire for particular effects. In general, polymerizations are carried out at pressures ranging from atmospheric to less than about 100 atmospheres and at temperatures ranging from −20° C. to at least about 100° C.

The process may be carried out preferably in excess carbon bisulfide wherein the carbon bisulfide acts as a suitable solvent. Other suitable solvents include aliphatic and aromatic hydrocarbons such as hexane, heptane, cyclohexane, benzene, toluene and in some cases ethers such as di-n-butyl ether, dioxane or tetrahydrofuran. The solvent in many cases functions as a diluent to increase the dispersion of the catalyst particles and thereby produce a colloidal solution. Another function of the solvent is to permit agitation of the reaction mixture, especially near the end of the polymerization when the reaction vessel contains a large amount of solid polymer. However, it has been found that the use of carbon bisulfide as a solvent for the reaction functions well as a diluent, dispersant and at the same time allows a higher concentration of carbon bisulfide for reaction and copolymerization with the selected monomer.

The process of the present invention can be carried out using various methods. Each such method employs a reaction vessel constructed of material unreactive to the reactants, solvent, or catalysts. Likewise the reaction vessel must be capable of sustaining the pressures developed in the process.

As a general procedure, carbon bisulfide was introduced into the reaction vessel. It was degassed of interfering gases by boiling under reduced pressure. The carbon bisulfide was then purged with an inert gas, such as argon, and placed under an inert pressure to protect it from the normal atmosphere. All charging and manipulations of the reaction vessel prior to the completion of the polymerizing reaction are carried out in an inert atmosphere in order to eliminate moisture, oxygen and carbon dioxide which are catalyst poisons. The catalyst and cocatalyst were injected into the carbon bisulfide under pressure. After the introduction of the catalyst system the reactor was pressurized with the reactant olefin at a low temperature. The temperature was then increased slowly to the desired range while vigorously agitating the reactants in the reactor vessel.

At the end of the polymerization reaction the polymer was treated to remove the residues of unreacted catalysts. Various procedures known to those skilled in the art are available in order to remove these residues and yield polymer with the optimum color and minimum ash content. Generally, the organometallic compounds are decomposed by the use of water or alcohol. When water or an alcohol is employed to decompose the catalyst fragments the water or alcohol is added initially then the solvent medium is removed. Further treatments may be applied for purifying the copolymers of the instant invention. The resulting polymers containing up to 25 percent by weight of sulfur are useful as elastomers, adhesives and molding compositions.

Numerous copolymerizations of carbon bisulfide and various representative olefins have been made using Ziegler-type catalysts according to the above described process. The following examples of copolymerizations involving Ziegler catalysts are given for purposes of illustration.

Example 1

Carbon bisulfide (500 ml.) was placed in a 1000 ml. glass autoclave equipped with a magnetic stirrer capable of 1200 r.p.m. and inlet for argon, ethylene and catalysts and temperature control means. The carbon bisulfide was purged with argon and thereafter an inert argon atmosphere maintained in the autoclave. Titanium tetrachloride (3.8 g.) and diethyl aluminum bromide (1.65 g.) were added to the carbon bisulfide and mixed thoroughly. The reactor vessel was pressurized slowly with ethylene up to 150 p.s.i. at 60° C.

The copolymerization was allowed to proceed for four hours. At the end of this time no more polymerization could be observed and the reaction was terminated. After cooling to room temperature the pressure was released. In order to destroy the catalysts 10 ml. of methanol was added to the contents of the autoclave. The mixture was then poured into two liters of methanol and washed. The copolymer was air dried. There was obtained a yield of 105 g. of copolymer. The sulfur analysis showed 0.52 percent sulfur present in the copolymer.

Example 2

Propylene and carbon bisulfide were copolymerized using various Ziegler-catalyst systems. Included in this example are six typical runs under various conditions.

The reactor employed was a stainless steel autoclave equipped with a turbine type agitator, pressure relief valve, temperature control means and inlet ports for gases and catalysts. In the experiments carbon bisulfide was first placed in the reactor. The carbon bisulfide in the reactor was placed under reduced pressure to "boil" the carbon bisulfide and remove any low boiling gaseous impurities. An inert argon atmosphere was introduced into the autoclave at slightly greater than atmospheric pressure. The catalyst system was introduced into the carbon bisulfide. Often a complexing agent was employed to aid copolymerization. The carbon bisulfide was saturated with propylene at 30° C. and about 80 p.s.i. After the charging was completed the autoclave was heated or cooled according to the temperature requirements for the run.

The copolymerizations were allowed to proceed for various time periods. At the end of the reaction period the reaction mixture was vented to remove excess gases. Methanol was added to destroy the catalyst. The precipitated copolymer was removed, washed, and dried. The following table gives the reaction data for six typical runs.

TABLE.—PROPYLENE-CS₂ COPOLYMERIZATION

| Experiment | CS₂ | Catalyst System* | Temp. (°C.) | Time (hr.) | Pressure (p.s.i.) | Yield (g.) | Percent Sulfur |
|---|---|---|---|---|---|---|---|
| 1 | 1 l. | 6 ml. EASC / 1 ml. VOCl₃ / 2 ml. TBA | 128 | 4 | 405 | 25 | 9.4 |
| 2 | 1 l. | 6 ml. EASC / 2 ml. VCl₄ / 2 ml. TBA | 128 | 4 | 440 | 40 | 3.5 |
| 3 | 1 l. | 9 ml. DEAB / 3 ml. VCl₄ / 10 ml. DCP | 104 | 17 | 300 | 80 | 1.4 |
| 4 | 600 cc | 1 g. 3TiCl₃·AlCl₃ / 4 cc. EASC | 60 | 60 | 160 | ¹ 50 / ² 5 | 0.51 / 4.2 |
| 5 | 2.2 l. | 6 ml. DEAB / 2 ml. VOCl₃ | −21 | 68 | atm. | 50 | 0.82 |
| 6 | 1 l. | 6 ml. EASC / 4 ml. (EtO)₃VOCl / 1.73 ml. TBA | 63 | 4 | 180 | 10 | 8.0 |

¹ Isotactic.
² Atactic.
*EASC=ethylaluminum sesquichloride.
  DEAB=diethylaluminum bromide.
  TBA=tributylamine.
  DCP=dicyclopentadiene.

Generally, when a vanadium catalyst was used the copolymer possessed an atactic configuration. When, as in Experiment 4, a titanium catalyst was used the copolymer was predominately isotactic. The molecular weights in the isotactic fraction of Experiment 4 were approximately 30,000 for $M_\eta$.

Example 3

In the same manner as Example 1, the copolymerization of ethylene-propylene-carbon bisulfide was carried out. After degassing the carbon bisulfide in the glass autoclave, 3 g. of diethylaluminum bromide and 0.15 ml. of vanadium oxychloride was introduced. Ethylene and propylene pressured into the carbon bisulfide in the reactor at a ratio of 1:3. The total pressure was taken up to 100 p.s.i. at 30° C. The temperature was maintained at 30 to 40° C. for four hours. At theendof the copolymerization there was obtained 40 g. of rubbery material. The sulfur analysis showed 0.55 percent sulfur present in the copolymer.

Example 4

In a similar reactor as used in Example 2 the copolymerization of butene-1 and carbon bisulfide was carried out. To 1-liter of "degassed" carbon bisulfide was added 6 ml. of diethylaluminum bromide and 2 ml. of vanadium oxychloride. The carbon bisulfide was then saturated with butene-1 to 20 p.s.i. at 30° C. The polymerization was conducted for four hours at 60° C. There was obtained after washing and drying 15 g. of a tacky rubbery material. The sulfur analysis showed 2.14 percent of sulfur to be present in the copolymer.

In an analogous reaction butene-1 and carbon bisulfide were copolymerized using 6 ml. of diethylaluminum bromide and 2 ml. of vanadium tetrachloride. Dicyclopentadiene (10 ml.) was added as a crosslinking agent. The carbon bisulfide was saturated with butene-1 to 20 p.s.i. at 30° C. The polymerization was conducted for 15 hours at 60° C. There was obtained 35 g. of a high molecular weight material. The sulfur analysis showed 0.73 percent sulfur to be present. The degree of unsaturation in the copolymer was measured as having an iodine value of 28.8.

Example 5

In a glass three-necked round bottom flask fitted with an argon inlet, a stirrer, a reflux condenser with a drying tube and a thermometer there was charged 1-liter of carbon bisulfide. After drying and deoxygenating the carbon bisulfide there was introduced into the reaction vessel a stoichiometric-complex of 1.7 ml. of titanium tetrachloride and 3 ml. of dimethyl aluminum chloride in benzene solution. The carbon bisulfide was saturated with butadiene at 1 atmosphere pressure and 30° C. The reaction began immediately and was allowed to continue for 17 hours. There was obtained 14 g. of a soft, flexible not very strong material. Sulfur analysis showed the copolymer to contain 0.52 percent sulfur.

A similar reaction as described above was conducted using 1 g. of $3TiCl_3 \cdot AlCl_3$ and 2 g. of monoisobutyl aluminum dichloride as the catalyst system. The copolymerization was allowed to proceed at room temperature. The polymerization was very rapid and after about 20 minutes gel formation occurred and the reaction was terminated. At the end of the reaction the copolymer formed was found to contain 0.30 percent sulfur.

Example 6

Into a 1-liter three-necked round bottom flask fitted with an argon inlet, a stirrer, a reflux condenser with a drying tube attached thereto and a thermometer was charged 300 ml. of carbon bisulfide. The carbon bisulfide was previously dried over molecular sieves. To the carbon bisulfide was previously dried over molecular sieves. To the carbon bisulfide was added 0.5 g. of cobalt (III) acetylacetonate followed by 100 ml. of styrene. The styrene had been washed with 5 percent sodium hydroxide solution, dried and distilled before use.

The solution was stirred under an argon atmosphere and then 2 ml. of ethylaluminum sesquichloride was added by means of a syringe. Upon addition of the sesquichloride there was an immediate rise in the temperature to 40° C. The carbon bisulfide was refluxed by the autogenous heat. Within 30 minutes the reaction subsided and external heating was applied for five hours.

About 500 ml. of methanol was added and the precipitated polymer was filtered, washed with a second portion of methanol and dried to give 26.3 g. of product. The sulfur analysis showed 0.24 percent sulfur in the copolymer.

Example 7

Triethyl aluminum (1.2 ml.) which is exceedingly reactive with carbon bisulfide was dissolved in 4.8 ml. of diphenyloxide. This solution was added under an argon atmosphere to 100 ml. of carbon bisulfide and 50 ml. of butene-1 in a coke bottle-type pressure container. To the reactants in the coke bottle was added 0.4 ml. of vanadium tetrachloride. The coke bottle was sealed and the reactants allowed to polymerize 16 hours at 35° C. At this time the bottle was cooled down and opened. The mixture was poured into 1-liter of methanol. There was obtained 4.6 grams of polymeric material. The copolymer was found to contain 0.56 percent sulfur.

Other examples of operable Zeigler catalyst systems to promote the copolymerization of carbon bisulfide with olefinic monomers, as herein contemplated, are dialkyl aluminum chloride and trialkyl aluminum compositions pre-complexed with a stoichiometric amount of a compound of a transition metal of Periodic Group IV–VIII.

Various changes and modifications may be made in the process described herein as will be apparent to those skilled in the chemical arts. It is accordingly intended that the present invention only be limited by the scope of the appended claims.

We claim:

1. A process for the copolymerization of carbon bisulfide and olefinic monomers comprising
    contacting carbon bisulfide and an olefinic monomer selected from the group consisting of α-olefins and conjugated dienes,
    in an inert atmosphere in the presence of a Zeigler-type catalyst selected from the group consisting of (A) a member selected from the class consisting of alkyl aluminum dihalide, alkyl aluminum sesquihalide, dialkyl aluminum bromide, dialkyl aluminum chloride·solvent-complex, and trialkyl aluminum·solvent-complex with a compound of a transition metal of Group IV–VIII; (B) dialkyl aluminum chloride stoichiometric-complexes with a compound of a transition metal of Group IV–VIII; and (C) trialkyl aluminum stoichiometric-complexes with a compound of a transition metal of Group IV–VIII,
    at pressures between atmospheric and superatmospheric up to about 100 atmospheres,
    at temperatures ranging from about −20° C. to about 100° C.

2. A process as stated in claim 1 wherein a complexing agent is present in the reaction zone.

3. A process as stated in claim 1 wherein said olefinic monomer is ethylene.

4. A process as stated in claim 1 wherein said olefinic monomer is propylene.

5. A process as stated in claim 1 wherein said olefinic monomers are ethylene and propylene.

6. A process as stated in claim 1 wherein said olefinic monomer is butene-1.

7. A process as stated in claim 1 wherein said olefinic monomer is butadiene.

8. A process as stated in claim 1 wherein said olefinic monomer is styrene.

9. A process as stated in claim 1 wherein said compound of a transition metal of Group IV–VIII is $TiCl_4$.

10. A process as stated in claim 1 wherein said compound of a transition metal of Group IV–VIII is $VCl_4$.

11. A process as stated in claim 1 wherein said compound of a transition metal of Group IV–VIII is $VOCl_3$.

12. A process as stated in claim 1 wherein said Zeigler-type catalyst is an alkyl aluminum dihalide and a compound of a transition metal of Group IV–VIII.

13. A process as stated in claim 1 wherein said Zeigler-type catalyst is an alkyl aluminum sesquihalide and a compound of a transition metal of Group IV–VIII.

14. A process as stated in claim 1 wherein said Zeigler-type catalyst is a dialkyl aluminum bromide and a compound of a transition metal of Group IV–VIII.

15. A process as stated in claim 1 wherein said Zeigler-type catalyst is a trialkyl aluminum·solvent-complex and a compound of a transition metal of Group IV–VIII.

16. A process as stated in claim 1 wherein said Zeigler-type catalyst is trialkyl aluminum stoichiometric complexes with a compound of a transition metal of Group IV–VIII.

17. A process as stated in claim 2 wherein said Ziegler-type catalyst is diethylaluminum bromide and $VCl_4$ and said olefinic monomer is propylene.

18. A process as stated in claim 1 wherein said Ziegler-type catalyst is ethylaluminum sesquichloride and $TiCl_4 \cdot AlCl_3$ and said olefinic monomer is propylene.

19. A process as stated in claim 1 wherein said Ziegler-type catalyst is diethylaluminum bromide and $TiCl_4$ and said olefinic monomer is ethylene.

References Cited

UNITED STATES PATENTS

| | | | |
|---|---|---|---|
| 3,081,287 | 3/1963 | Coover et al. | 260—93.7 |
| 3,326,879 | 6/1967 | Yamada et al. | 260—93.7 |
| 2,531,601 | 11/1950 | Bell et al. | 260—79 |
| 2,841,574 | 7/1958 | Foster | 260—79 |
| 3,255,156 | 6/1966 | Barney | 260—79 |

DONALD E. CZAJA, *Primary Examiner.*

M. I. MARQUIS, *Assistant Examiner.*